No. 814,122. PATENTED MAR. 6, 1906.
H. G. ECKSTEIN.
APPARATUS FOR THE MANUFACTURE OF MOISTURE PROOF CARTONS.
APPLICATION FILED JUNE 25, 1904.
3 SHEETS—SHEET 1.
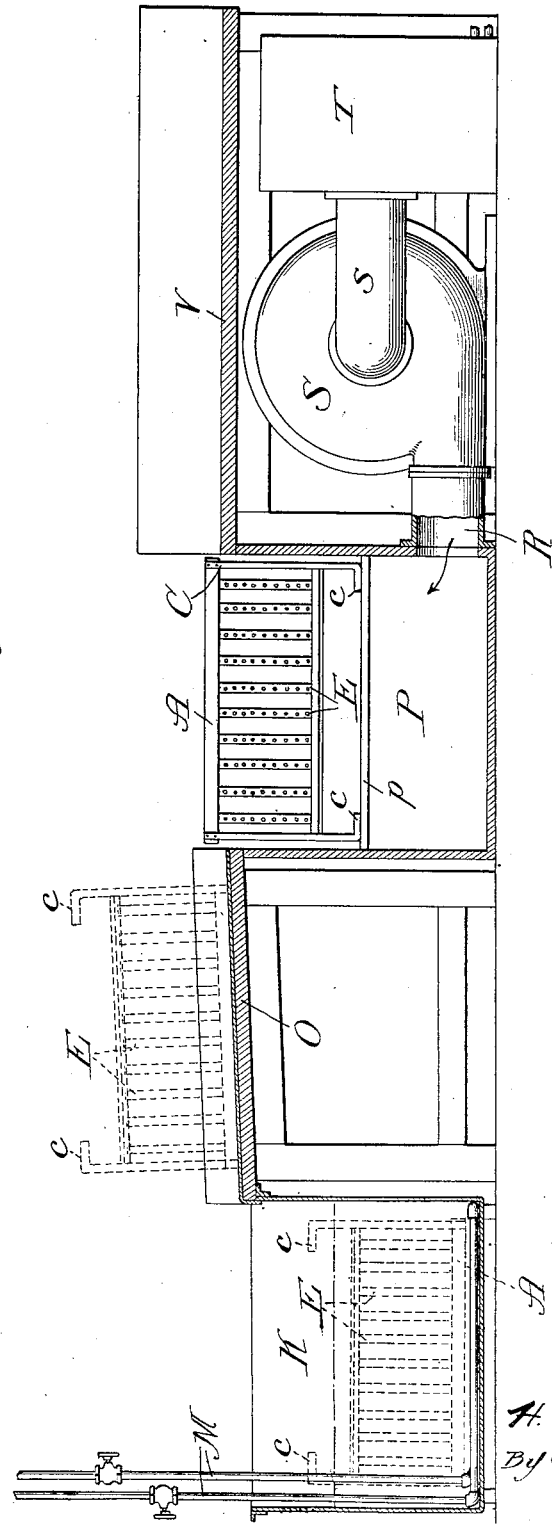

No. 814,122. PATENTED MAR. 6, 1906.
H. G. ECKSTEIN.
APPARATUS FOR THE MANUFACTURE OF MOISTURE PROOF CARTONS.
APPLICATION FILED JUNE 25, 1904.
3 SHEETS—SHEET 2.
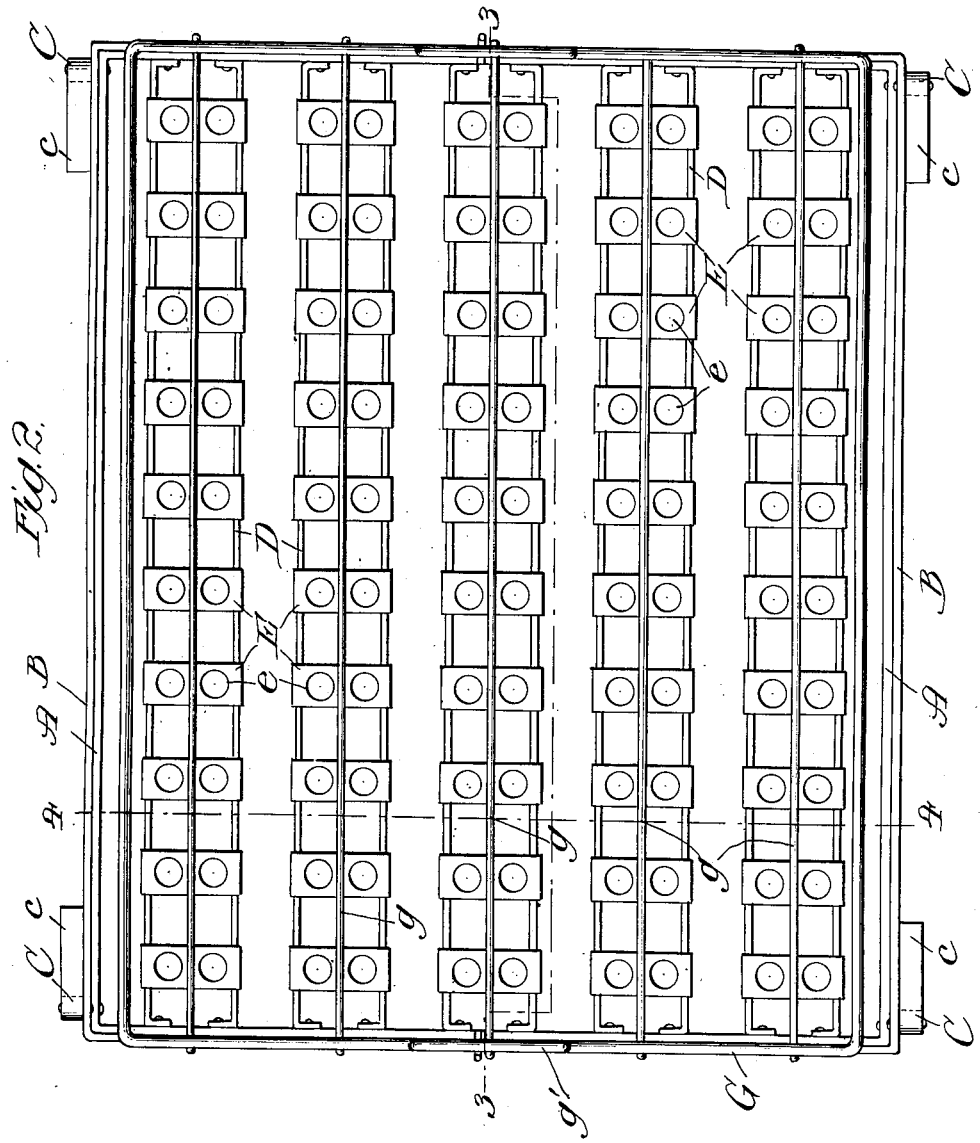

No. 814,122. PATENTED MAR. 6, 1906.
H. G. ECKSTEIN.
APPARATUS FOR THE MANUFACTURE OF MOISTURE PROOF CARTONS.
APPLICATION FILED JUNE 25, 1904.
3 SHEETS—SHEET 3.
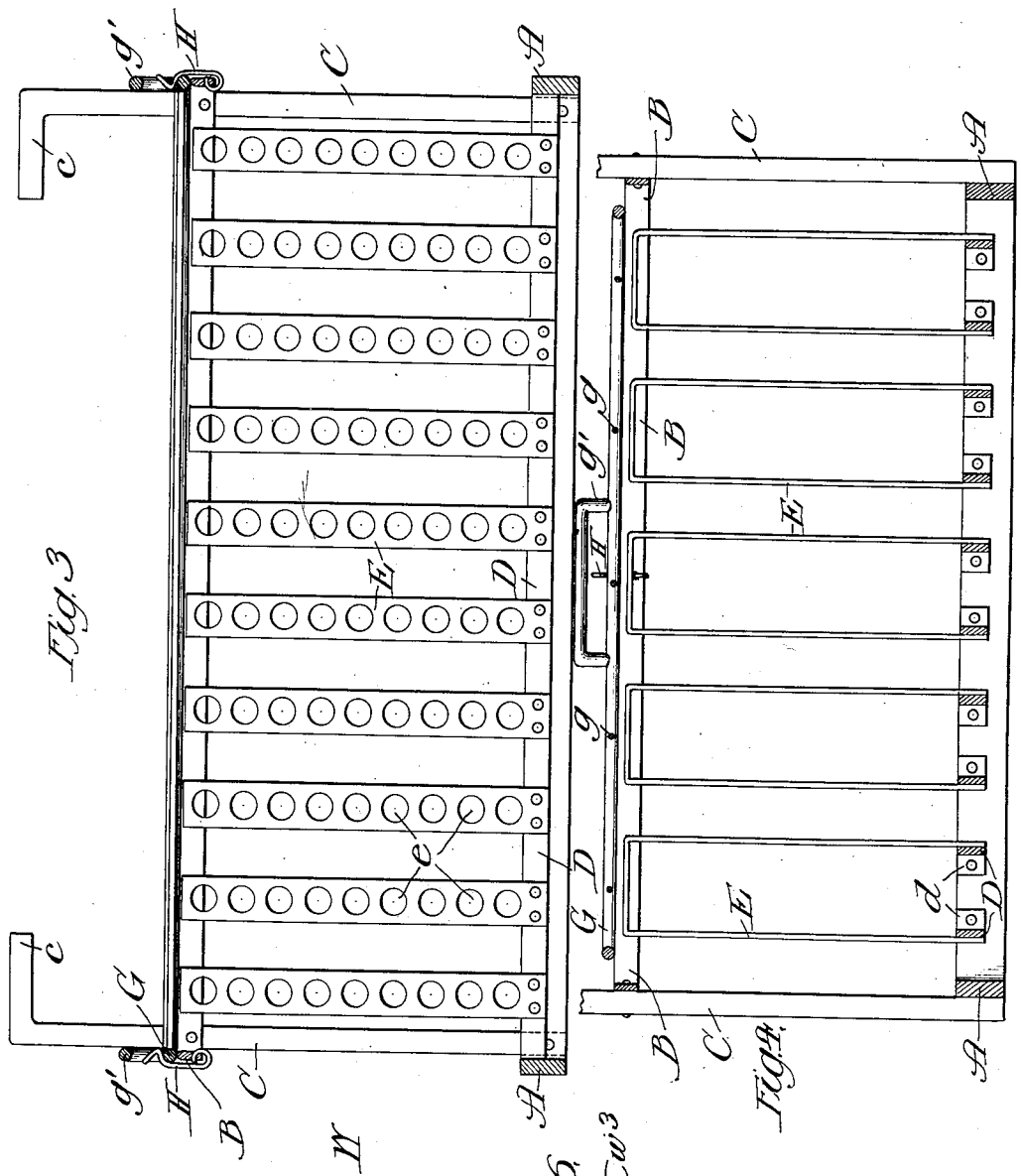
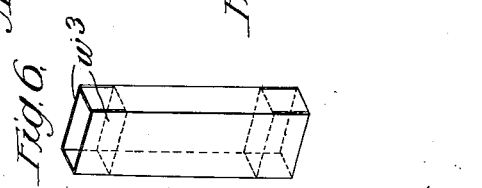

UNITED STATES PATENT OFFICE.

HENRY G. ECKSTEIN, OF CHICAGO, ILLINOIS.

APPARATUS FOR THE MANUFACTURE OF MOISTURE-PROOF CARTONS.

No. 814,122.  Specification of Letters Patent.  Patented March 6, 1906.

Application filed June 25, 1904. Serial No. 214,099.

*To all whom it may concern:*

Be it known that I, HENRY G. ECKSTEIN, a citizen of the United States, residing in Chicago, county of Cook, and State of Illinois, have invented certain new and useful Improvements in Apparatus for the Manufacture of Moisture-Proof Cartons, of which I do declare the following to be a full, clear, and exact description, reference being had to the accompanying drawings, forming part of this specification.

The present invention has for its object to provide an improved apparatus whereby paper cartons, such as are commonly used for inclosing candied popcorn or like confections or other small articles liable to be injuriously affected by atmospheric moisture, may be rendered practically moisture-proof.

The invention consists in the features of novelty hereinafter described, illustrated in the accompanying drawings, and particularly defined in the claims at the end of this specification.

Figure 1 is a view in vertical longitudinal section through a form of apparatus embodying my invention. Fig. 2 is a plan view, upon an enlarged scale, of the cage or basket for containing the cartons to be treated. Fig. 3 is a view in vertical section on line 3 3 of Fig. 2. Fig. 4 is a view in vertical cross-section on line 4 4 of Fig. 2. Fig. 5 is a plan view of a blank from which a carton may be formed. Fig. 6 is a perspective view of a carton adapted to be treated in keeping with my invention.

The cage or basket for containing the cartons to be treated consists of a rectangular metal frame the base-bars A of which are connected to the top bars B by means of upright bars C. The upright bars C are extended to a point above the cage, as clearly shown in Figs. 1 and 3 of the drawings, and have their ends turned inwardly to form the handles $c$, whereby the cage or basket may be conveniently lifted. From end to end of the base-bars A extend the longitudinal bars D, that are securely riveted, as at $d$, to the bars A. To these longitudinal bars D are secured the upright carton-holders E, that preferably consist of U-shaped bars having openings $e$ therein, these carton-holders being set at such distances apart as to prevent the cartons when in position upon their holders from contacting one with another.

The form of carton for the treatment of which the invention is more especially adapted is illustrated in Figs. 5 and 6 of the drawings. This carton W, which is preferably formed from a sheet of Manila paper of good quality, is severed or cut along the line $w$ to form the terminal flaps $w'$ and is scored along the lines $w^2$ to determine the points at which the blank is to be folded. When the blank is folded, as shown in Fig. 6 of the drawings, the overlapping edges $w^3$ are sealed by a suitable glue, which readily adheres to the surface of the edges, and this cutting of the terminal flaps, the scoring and folding of the blank, and the sealing of the overlapping edges will be effected before the blank is subjected to the treatment in my improved apparatus. It will be understood by those familiar with this class of cartons that the terminal flaps are designed to be folded one upon the other when the carton is to be closed; but in the practice of my invention the rendering of the carton moisture-proof is effected after it has been folded to the shape shown in Fig. 6 and after its overlapping edges have been sealed, but while its terminal flaps are still in extended position. Open-ended cartons, such as shown in Fig. 6 of the drawings, will be set over the carton-holders E of the cage or basket, and after the cartons are in place a retaining frame or grid will be placed over the top of the basket to prevent the accidental slipping of the cartons from their holders when the basket is to be reversed, as will hereinafter appear. Preferably the retaining-frame consists of an outer bar G, from end to end of which extend a series of rods or wires $g$, corresponding in number and arrangement with the several rows of carton-holders. The retaining frame or grid is provided at its ends with handles $g'$, whereby it may be conveniently lifted, and in order to hold the retaining-frame in position when the cage or basket is reversed suitable detachable fastening devices will be provided for securing the retaining frame or grid to the top of the cage or basket. As shown, these retaining devices consist of spring-clips H, the lower ends of which are secured to the top bar B of the cage or basket, while their upper bent ends are adapted to spring over and retain the end bars of the retaining frame or grid. (See Fig. 3.)

After the cartons have been placed in position upon the carton-holders and the retaining frame or grid has been set in place, as shown in Fig. 3, the cage or basket will be lowered into a bath or vessel K of melted paraffin that may be maintained at the desired temperature (say about 230° Fahrenheit) by means of suitable steam-pipes M. The cartons thus immersed in the bath will be allowed to remain there (say from three to ten minutes) until they become thoroughly impregnated with the paraffin, after which the cage or basket will be lifted by the handles $c$ and will be set upon a table O, the bottom of which inclines downwardly toward the bath or vessel K. The cage or basket will be allowed to remain upon the table O (say from three to ten minutes) while the excess wax drains from the open-ended cartons, after which the basket will be inverted and placed in a suitable box or casing P, the sides of which are provided with suitable rails or supports $p$, whereon the handles $c$ of the cage or basket will rest. The purpose in thus inverting the cartons while the paraffin-wax is in a fluid condition is to permit the flow of the wax toward the inverted ends of the cartons, and thus insure a more uniform distribution of the wax from end to end of the cartons. While the cartons are thus held in inverted position, they are subjected to a cooling operation for the purpose of quickly setting the wax, causing it to form a film over the entire inner and outer surfaces of each carton. The apparatus whereby a blast of cool air is directed through the cartons comprises a pipe R, that opens into the bottom of the box or casing P, this pipe R leading from a blower S, the induction-pipe $s$ of the blower being preferably connected to a cooling-chamber T of any suitable character adapted to reduce the temperature of the air below that of the surrounding atmosphere. The cartons will be allowed to remain within the box P until the paraffin has set or hardened upon their surfaces, after which the attendant will remove the retaining frame or grid from the top of the cage or basket and will thereafter dump the cartons onto a table V, extending above the blower S.

By my improved apparatus the cartons after they have been scored and folded and after their overlapping edges have been sealed are held separate one from another during the treatment, so that not only is the body of the paper rendered moisture-proof at all points, but the scored upper corners of the carton are coated with films of wax which allow the terminal flaps to be subsequently folded without destroying the moisture-proof character of the carton at such points.

It is manifest that the details of the present invention may be modified without departing therefrom and that features of the invention may be employed without its adoption as an entirety.

I do not wish to be understood as claiming herein the method of treating cartons to render them waterproof incident to the operation of the above-described apparatus, as such invention is set forth and claimed in an application filed by me August 22, 1903, Serial No. 170,418.

Having thus described my invention, what I claim as new, and desire to secure by Letters Patent, is—

1. An apparatus for forming moisture-proof cartons comprising a bath for containing the paraffin or like material wherein the cartons will be immersed, a cage for holding said cartons, a support for said cage and means for directing a blast of air through said cage and through the cartons contained therein.

2. An apparatus for the manufacture of moisture-proof cartons comprising a bath for the paraffin or like material into which the cartons will be dipped, a cage for holding said cartons, a draining-table adjacent said bath for sustaining said cage with the cartons therein, a support provided with means for holding said cage in reverted position and an air-blast pipe extending beneath said support and adapted to direct a blast of air through said support and the cartons contained therein.

3. An apparatus for forming moisture-proof cartons comprising a bath for the paraffin or like material into which the cartons will be dipped, said bath being provided with means for heating the paraffin, a cage for holding the cartons, a draining-table for sustaining said cage after it has been lifted from the bath, a support for holding said cage and an air-blast pipe leading to a point beneath the cage when upon said support and adapted to deliver a blast of air through said cage and the cartons contained therein.

4. An apparatus for forming moisture-proof cartons comprising a cage having an open-work bottom and top and provided upon its interior with a plurality of individual supports for holding the cartons separated within the cage.

5. An apparatus for forming moisture-proof cartons comprising a cage having an open-work bottom and top and provided upon its interior with means for holding the cartons in separate position, the top of said cage being provided with offsets adapted to hold the top of the cage above a support when the cage has been reversed.

HENRY G. ECKSTEIN.

Witnesses:
 ALBERTA ADAMICK,
 GEO. P. FISHER, Jr.